(12) United States Patent
Su et al.

(10) Patent No.: US 8,740,531 B2
(45) Date of Patent: Jun. 3, 2014

(54) SCREW

(75) Inventors: Kou-Tsair Su, Kaohsiung (TW);
Yu-Jung Su, Kaohsiung (TW)

(73) Assignees: Taiwan Shan Yin Int'l Co., Ltd.,
Kaohsiung (TW); Biomate Medical Devices Technology Co., Ltd.,
Kaohsiung (TW)

( * ) Notice: Subject to any disclaimer, the term of this patent is extended or adjusted under 35 U.S.C. 154(b) by 229 days.

(21) Appl. No.: 13/222,071

(22) Filed: Aug. 31, 2011

(65) Prior Publication Data

US 2013/0051955 A1 Feb. 28, 2013

(51) Int. Cl.
*F16B 25/10* (2006.01)

(52) U.S. Cl.
USPC ........................................ 411/387.1; 411/412

(58) Field of Classification Search
USPC ................ 411/412, 418, 387.1, 387.3, 387.5, 411/387.6, 387.7, 387.8
See application file for complete search history.

(56) References Cited

U.S. PATENT DOCUMENTS

| | | | | |
|---|---|---|---|---|
| 438,754 A | * | 10/1890 | Rogers | 411/387.1 |
| 3,083,609 A | * | 4/1963 | Lovisek | 411/386 |
| 3,937,119 A | * | 2/1976 | Ernst | 411/422 |
| 4,655,661 A | * | 4/1987 | Brandt | 411/387.1 |
| 6,186,716 B1 | * | 2/2001 | West et al. | 411/30 |
| 6,354,779 B1 | * | 3/2002 | West et al. | 411/80.1 |
| 6,857,832 B2 | * | 2/2005 | Nygård | 408/211 |
| 7,393,170 B2 | * | 7/2008 | Chen | 411/387.1 |
| 8,192,124 B2 | * | 6/2012 | Wolpert et al. | 411/387.1 |
| 2006/0140738 A1 | * | 6/2006 | Lin | 411/186 |
| 2009/0142159 A1 | * | 6/2009 | Wolpert et al. | 411/387.1 |

* cited by examiner

*Primary Examiner* — Gary Estremsky (74) *Attorney, Agent, or Firm* — Rosenberg, Klein & Lee (57) ABSTRACT

A screw includes a positioning member defined on inclined cutting planes of a drilling portion of the screw for stably allowing a cutting edge constructed at a convergence of the cutting planes to cut efficiently. A threaded section formed on a shank of the screw is extended toward the cutting edge and connected with one end of the cutting edge. The positioning member helps the screw fixedly stand on an object. The cutting edge and the cutting planes allow cutting debris to be swiftly and smoothly extruded therefrom into the threaded section for avoiding the piling of the considerable cutting debris. Thereby, the screwing torque is reduced and the drilling speed is promoted. Preferably, the fastened screw is sunken in the object, and the fastening operation is completed successfully.

9 Claims, 10 Drawing Sheets

FIG. 1

(PRIOR ART)

FIG. 2

(PRIOR ART)

SCREW

BACKGROUND OF THE INVENTION

1. Field of the Invention

The present invention relates to a fastener design, particularly to a screw.

2. Description of the Related Art

Figure 1:
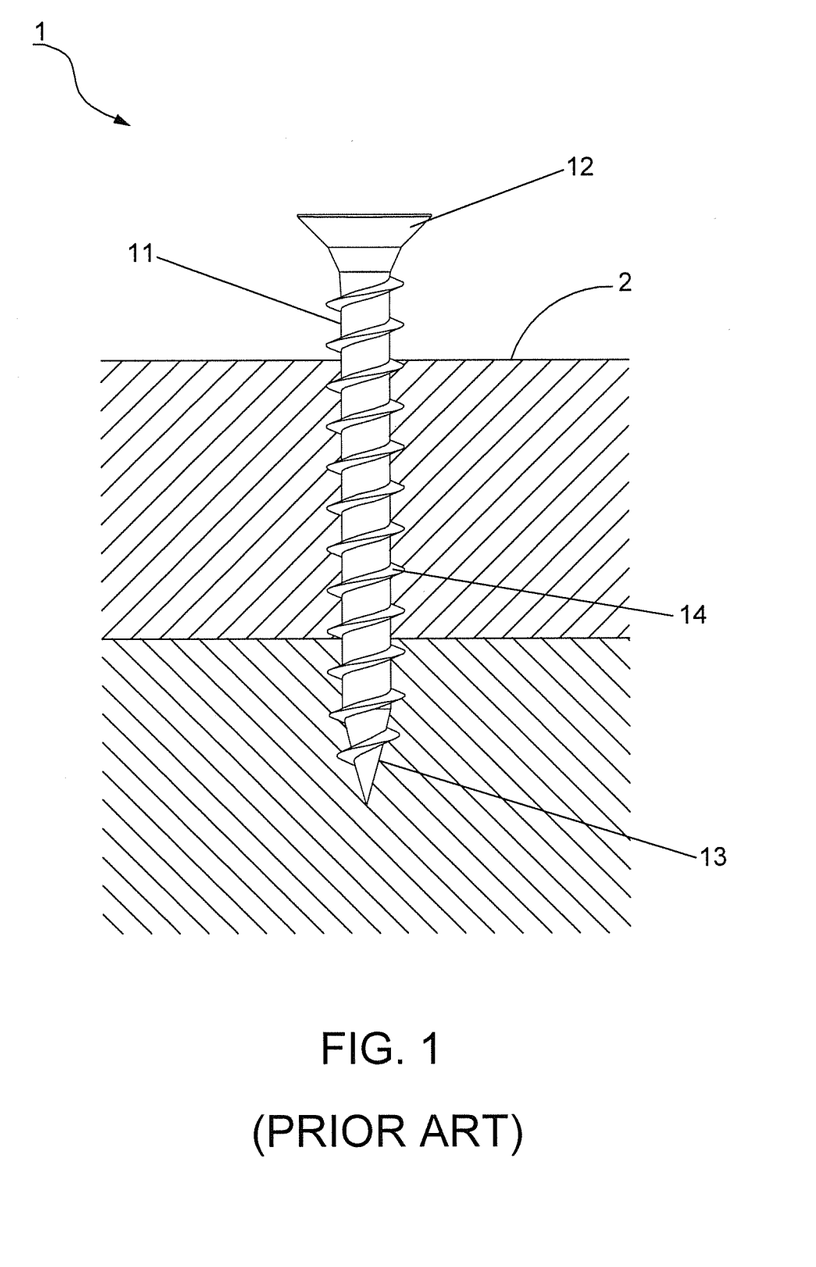
FIG. 1 is a schematic view showing a conventional screw.

Referring to FIG. 1, a conventional screw 1 comprises a shank portion 11, a head portion 12 disposed at one end of the shank portion 11, a drilling portion 13 disposed at the other end of the shank portion 11, and a plurality of threaded units 14 spirally disposed around the shank portion 11. Wherein, the drilling portion 13 is formed into a tapered end. Thus, the screw 1 directly enters an object 2 via the tapered drilling portion 13, and the following threaded units 14 continue entering the object 2 so as to achieve a fastening effect.

Afore screw 1 might be smoothly fastened into the object 2 by means of the drilling portion 13 piercing the object 2. However, in practice, the object 2 is forcedly pierced by the tapered drilling portion 13. Thus, fibers contained in the object 2 are difficult to be severed efficiently. That is to say, the fibers are just simply pushed and thrust by the tapered drilling portion 13, so the screw 1 would be easily impeded by debris resulted from the object 2 in time of drilling. As a result, the debris can not be timely expelled, and the heaped debris incurs an increasing resistance on the screw 1. Thereby, the operation of fastening the screw 1 is influenced.

Figure 2:
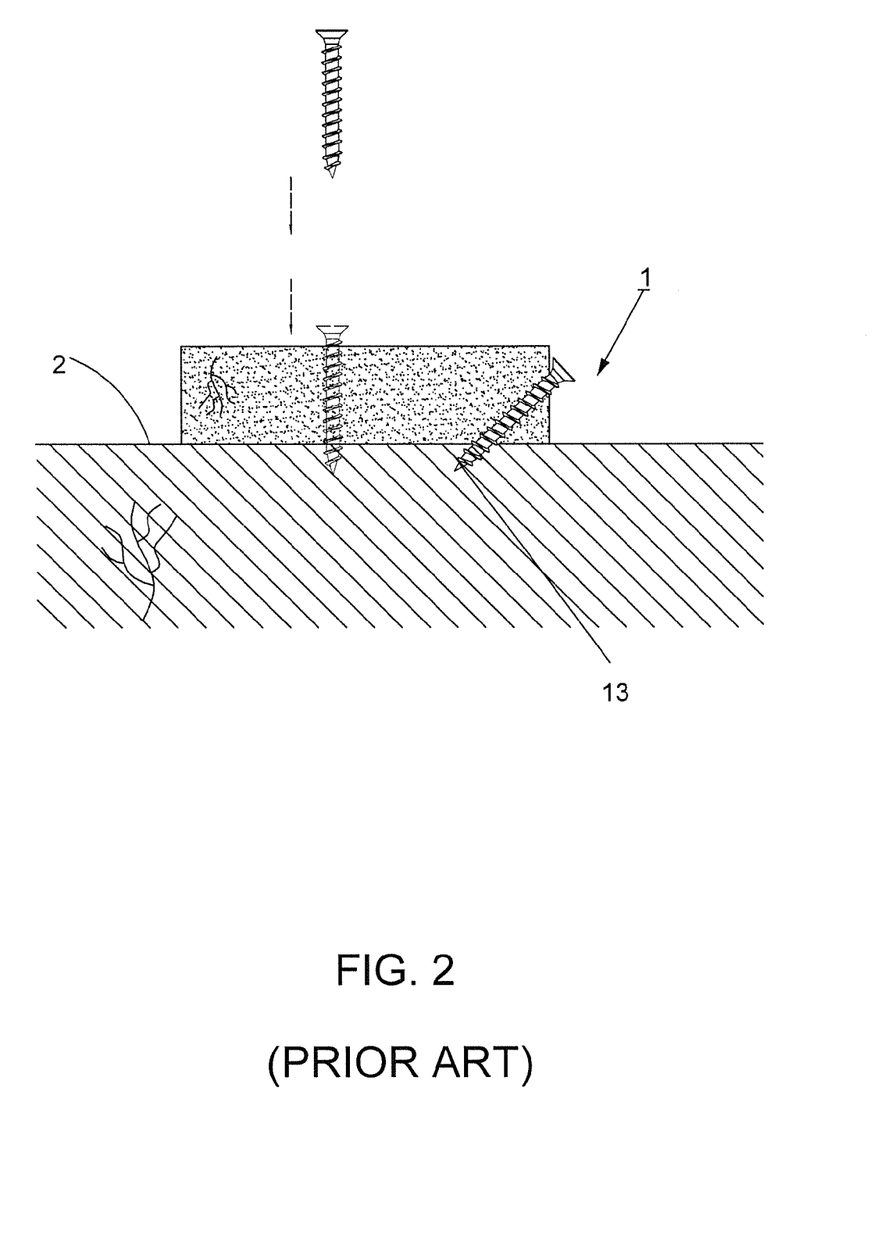
FIG. 2 is a schematic view showing the conventional screw.

Referring to FIG. 2, the upright screw 1 in the object 2 might be subject to rustiness since water might pile on the head portion 12. Therefore, in the practical application, the screw 1 is disposed tilting in the object 2. Herein, if the cutting debris can not be timely expelled, the head portion 12 easily bulges out of the object 2 after screwing. Such abnormal operation is unbeneficial for further fastening. Therefore, the screw 1 needs improvements.

SUMMARY OF THE INVENTION

It is therefore the purpose of this invention to provide a screw that is able to timely expel debris, efficiently decrease screwing resistance, and preferably promote screwing speed so as to allow the screw to be embedded in an object properly.

The screw in accordance with the present invention comprises a shank portion, a head portion disposed at one end of the shank portion, a drilling portion disposed at the other end of the shank portion, and a plurality of threaded units spirally disposed around the shank portion. Two inclined cutting planes are formed on the drilling portion and are connected at a cutting edge. Characterized in that, a positioning member is defined on the cutting planes of the drilling portion for stabilizing the cutting edge to execute cutting. The threaded units extend toward the cutting edge and connect to one end of the cutting edge.

Preferably, a threaded section including a plurality of auxiliary threaded units is disposed around the shank portion; the auxiliary threaded units are disposed between the threaded units; a first diameter of the auxiliary threaded units is smaller than a second diameter of the threaded units.

Preferably, a plurality of indented units are defined on the auxiliary threaded units; a plurality of slots are defined on a part of the threaded units.

Preferably, the positioning member is integrally bulged outwards from the cutting planes to form a pointed unit.

Preferably, the pointed unit is formed by a plurality of inclined walls to structure a pyramid.

Preferably, the pointed unit is structured into a cone.

Preferably, the positioning member is formed by a plurality of inclined walls that are indented from the cutting planes, thereby resulting in a valley on the cutting planes; points are defined on convergences of the inclined walls and the cutting edge.

Accordingly, the positioning member helps the cutting edge stably stand on a screwing object, which allows the cutting edge to provide a scraping effect in time of drilling. Further, the cutting planes guide cutting debris to smoothly enter the channels between the threaded units so as to rapidly expel the cutting debris therefrom. Thereby, the cutting debris does not pile into the vacancy of the threaded units, so that the screwing torque could be decreased but the screwing speed could be enhanced. Moreover, the screw is favorably embedded in a screwing object without any protrudent part. Therefore, such even screwing object is beneficial to be further fastened.

DETAILED DESCRIPTION OF THE PREFERRED EMBODIMENTS

Wherever possible, the same reference numbers are used in the drawings and the description to refer to the same or like parts.

Figure 3:
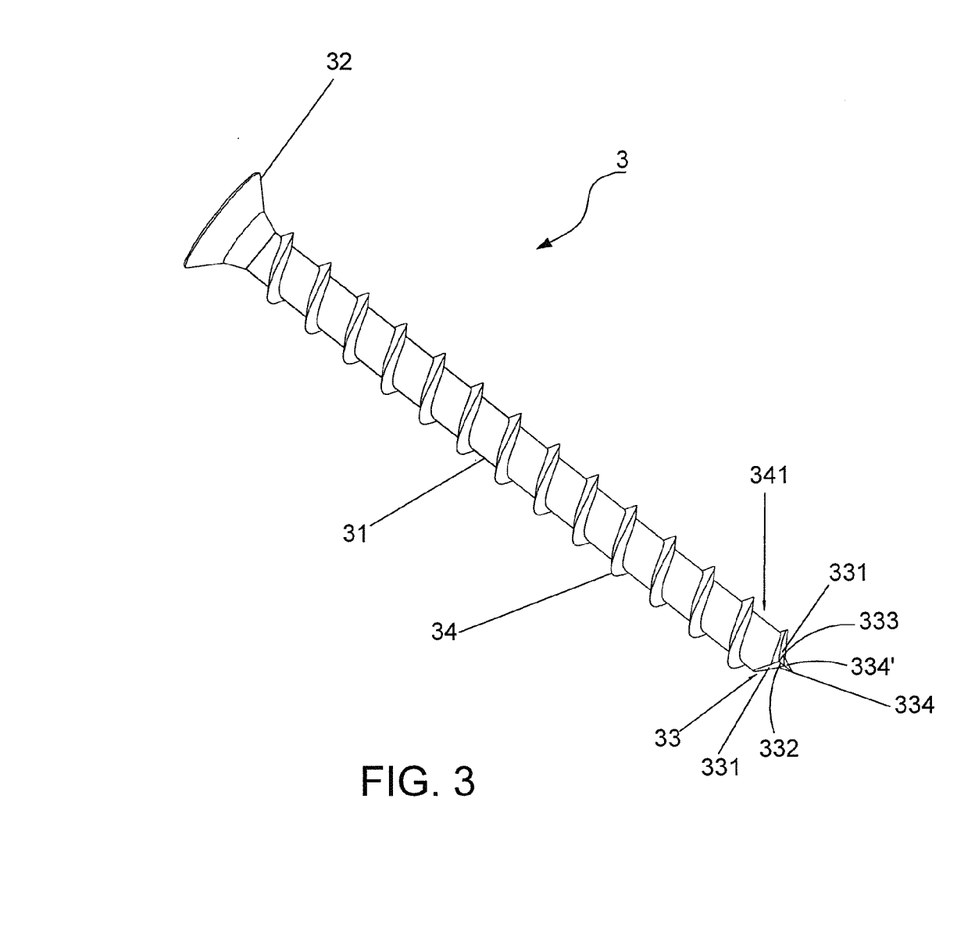
FIG. 3 is a schematic view showing a first preferred embodiment of the present invention.
Figure 4:
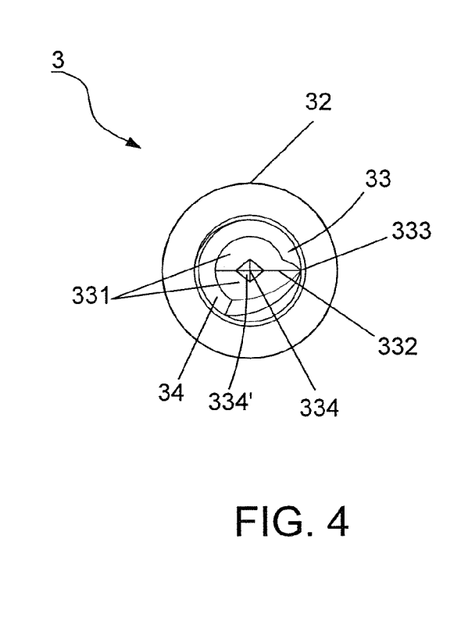
FIG. 4 is an end view of FIG. 3.
Figure 5:
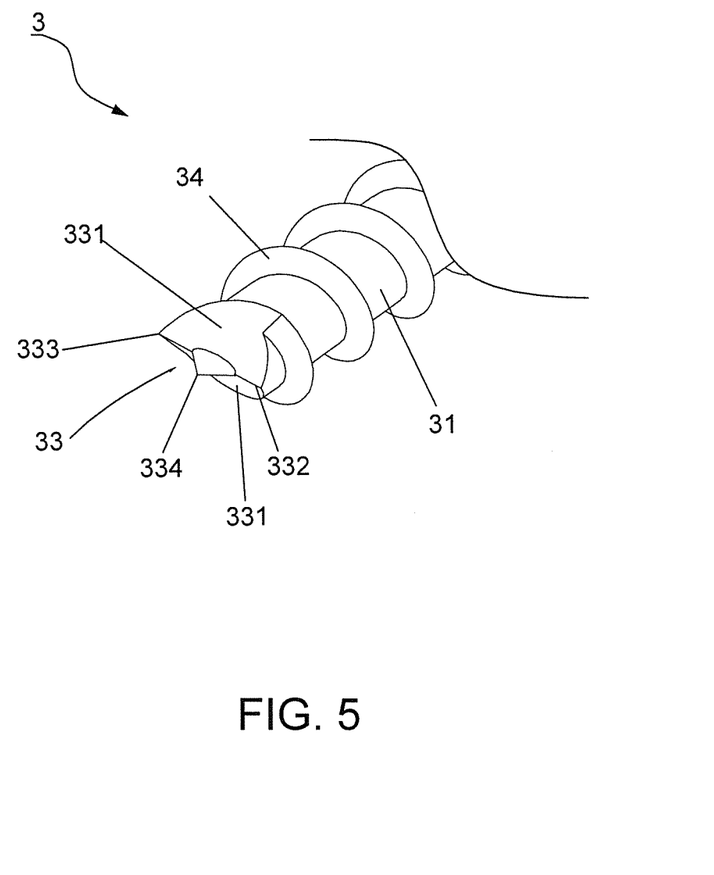
FIG. 5 is a schematic view showing a second preferred embodiment of the present invention.

Referring to FIG. 3, a first preferred embodiment of the present invention is shown. In order to clearly show the features of the screw 3, the screw 3 in this figure and in the following embodiments is presented by one side. A screw 3 comprises a shank portion 31, a head portion 32 disposed at one end of the shank portion 31, a drilling portion 33 disposed at the other end of the shank portion 31, and a plurality of threaded units 34 surroundingly disposed around the shank portion 31. Wherein, a channel 341 is defined amid the threaded units 34. Further referring to FIG. 4, two inclined cutting planes 331 are convergently formed on the drilling portion 33, and a cutting edge 332 is formed on the convergence of the cutting planes 331. Additionally, a positioning member 334 is defined on the cutting planes 331. Herein, the positioning member 334 is integrally bulged outwards from the cutting planes 331 to structure a pointed unit. Wherein, the pointed unit of the positioning member 334 is assembled by a plurality of inclined walls 334' bulged from the cutting planes 331. In the figure, there are four inclined walls 334' forming a square pyramid. Alternatively, while the pointed unit of the positioning member 334 is structured by a cone that also integrally bulges from the cutting planes 331, an oblate cone could be especially defined on the cutting planes 331 as preferably shown in FIG. 5. Accordingly, however the pointed unit on the positioning member 334 is designed outward protrudent from the cutting planes 331, a precise positioning effect on an object 4 in time of drilling is provided. Continuingly, the cutting edge 332 preferably scrapes the object 4 in time of drilling. Moreover, while the threaded units 34 around the shank portion 31 extend to the cutting edge 332 and connect to an end 333 of the cutting edge 332, the channel 341 is formed as an intercommunicated channel amid the threaded units 34.

Figure 6:
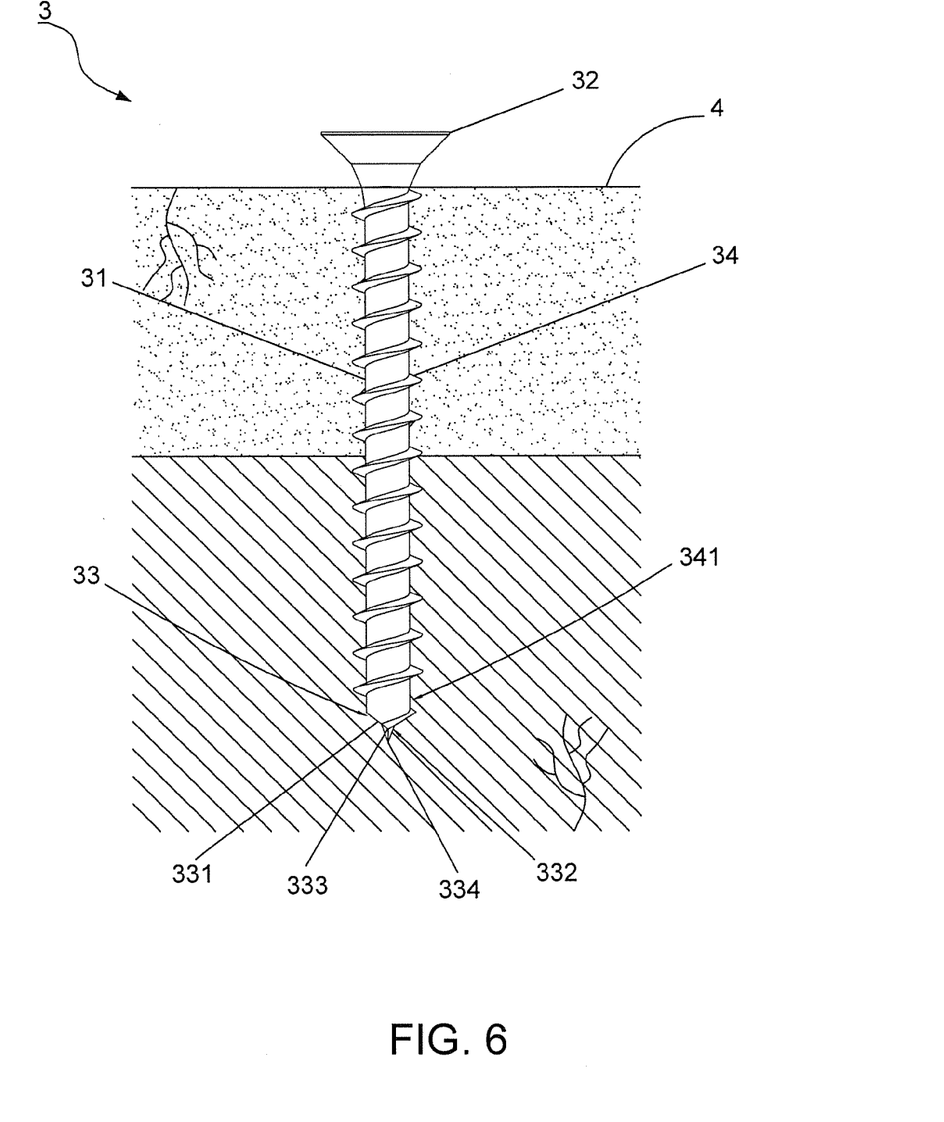
FIG. 6 is a schematic view showing the first preferred embodiment of the present invention in screwing.

Referring to FIG. 6, in operation, the positioning member 334 props the screwing object 4 (plywood is adopted in the figure) for achieving a stable positioning effect. Thereby, the head portion 32 is imparted by a screwing torque for allowing the drilling portion 33 to enter the object 4 by means of the cutting edge 332 scraping the object 4. Moreover, since the threaded units 34 extend and connect to the end 333 of the cutting edge 332, a gradual screwing effect is brought about as soon as the cutting edge 332 contacts the object 4. Obviously, the cutting edge 332 not only drills the object 4 but also rubs the object with a sharp progression. As to the inclined cutting planes 331, they guide cutting debris generated in time of drilling to enter the threaded units 34. Thereby, the cutting debris further travels into the channel 341 that is connected to the cutting planes 331. Accordingly, the cutting debris is promptly removed through the channels 341. Thus, there is no redundant cutting debris obstructing and compressing the vacancy between the screw and the object. Therefore, embedded in the object 4, the screw 3 is able to provide a stable fastening effect. Favorably, however the screw 3 is positioned upright or slanted, a firm and stationary positioning effect of the screw 3 in the object 4 could be ensured, and the screw 3 does not protrude out of the object 4. As a result, the object 4 has a smooth appearance for a further combination.

Figure 7:
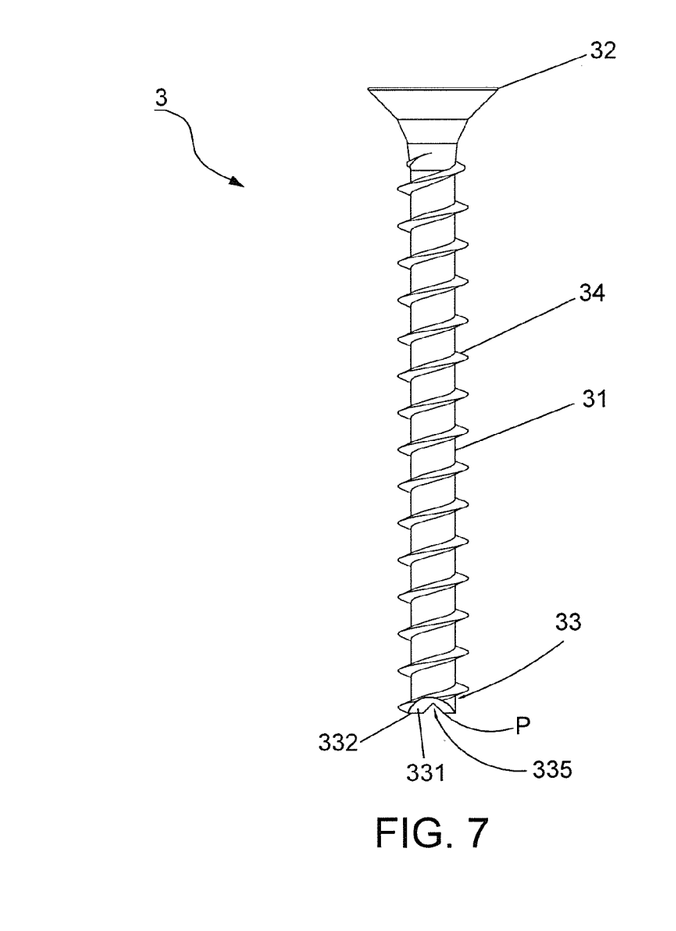
FIG. 7 is a perspective view showing a third preferred embodiment of the present invention.
Figure 8:
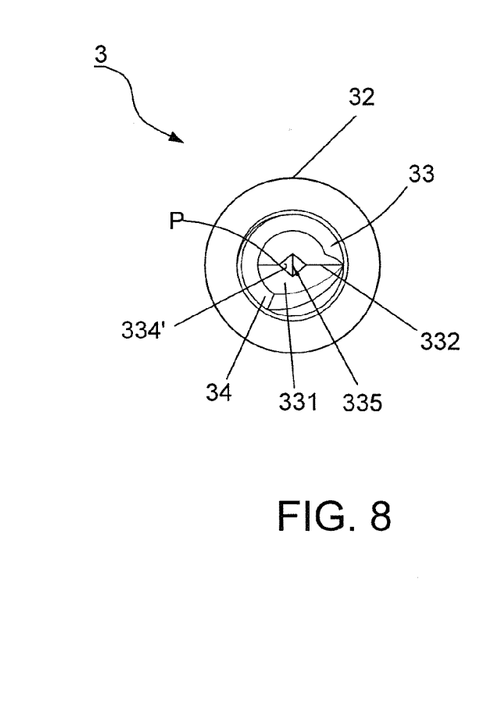
FIG. 8 is an end view of FIG. 7.

Referring to FIGS. 7 and 8, a third preferred embodiment is shown. In order to clearly show the features of the screw 3, the screw 3 in these figures and in the following embodiments are shown by another sides different from those of afore embodiments. Wherein, the screw 3 similarly comprises the shank portion 31, the head portion 32, the drilling portion 33, and the threaded units 34. Differently, the positioning member 334 is surroundingly assembled by a plurality of inclined walls 334' that are indented on the cutting planes 331, thereby contributing to a valley 335 thereon. Additionally, points P are defined on convergences of the inclined walls 334' and the cutting edge 332. Accordingly, this embodiment utilizes the points P formed on the cutting edge 332 to support the flat cutting edge 332 and the cutting planes 331 on the object (not shown) in time of drilling, so that an accurate positioning effect is attainable. Further by the cooperation of the cutting edge 332 and the threaded units 34, the screw 3 could be drilled in the object with an appropriate speed. A certain cutting effect and a clear debris guiding effect are also obtainable for concurrently decreasing the screwing torque. As a result, the screw 3 is able to provide a speedy fastening effect and a concealing screwing result.

Figure 9:
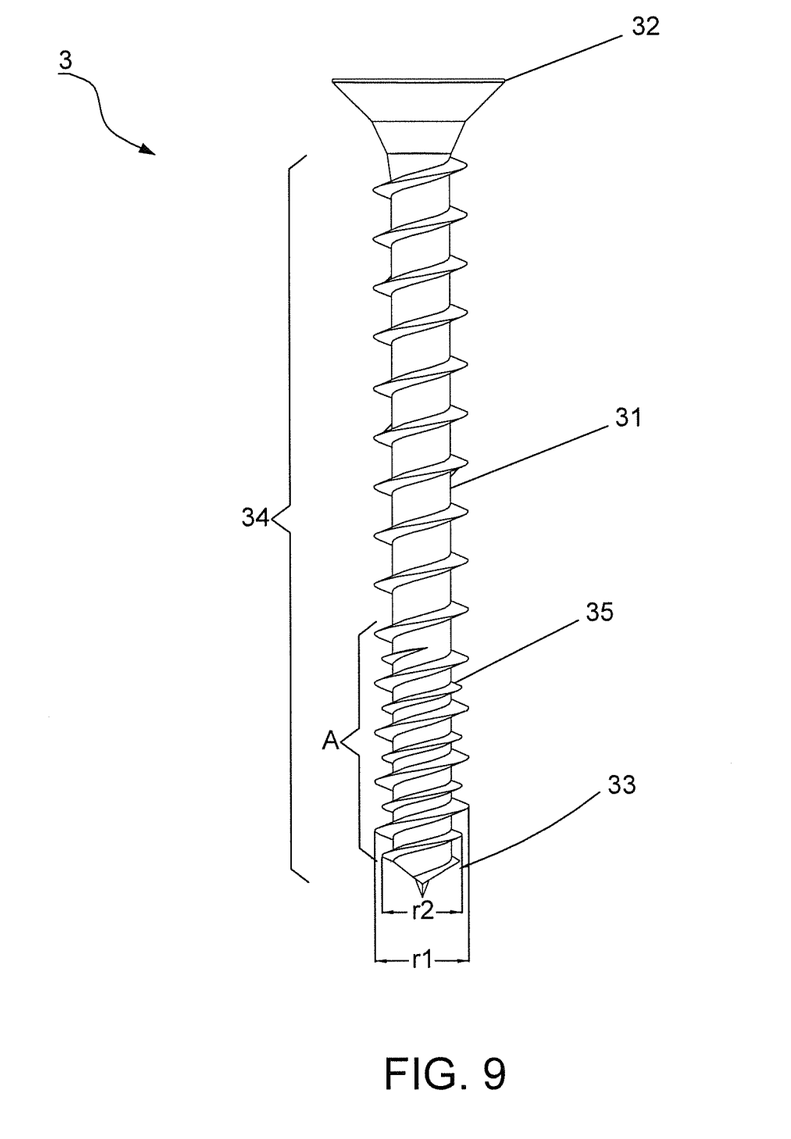
FIG. 9 is a schematic view showing a fourth preferred embodiment of the present invention.
Figure 10:
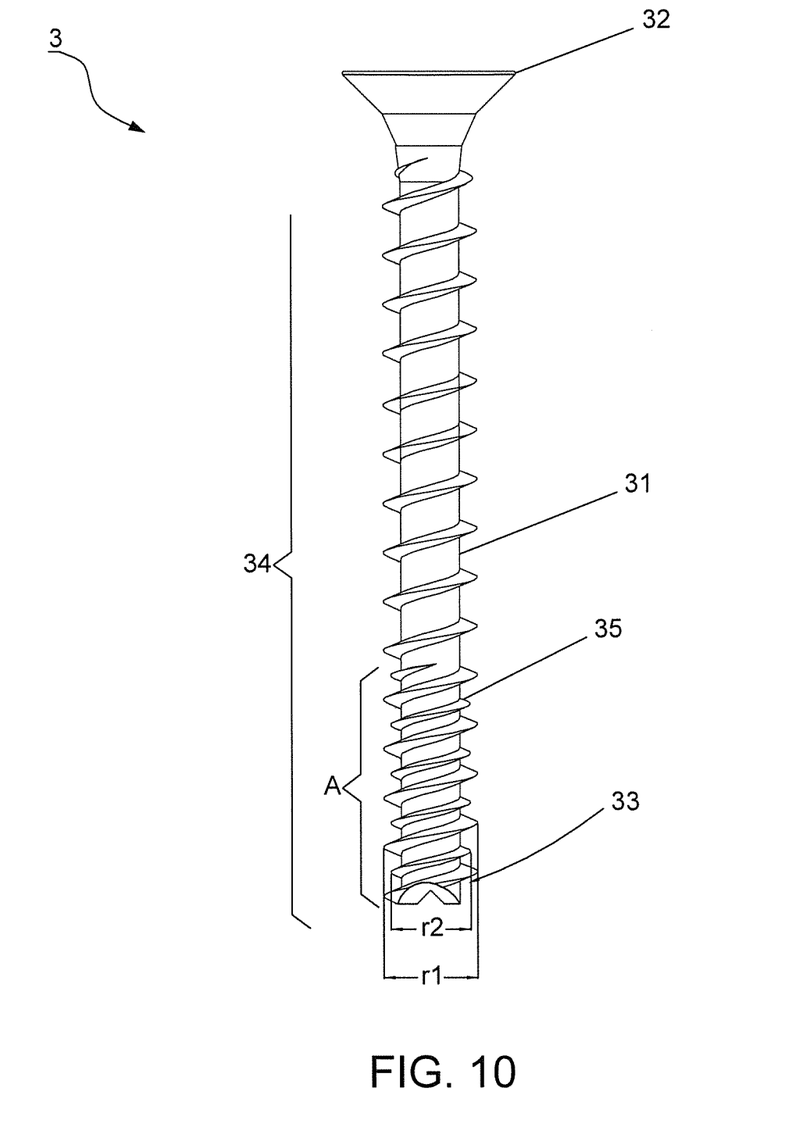
FIG. 10 is a schematic view showing a fifth preferred embodiment of the present invention.

Referring to FIG. 9, a fourth preferred embodiment is shown. The screw 3 similarly comprises a shank portion 31, a head portion 32, a drilling portion 33, and a plurality of threaded units 34. The correlations and functions are also alike to those in the first and the second preferred embodiments. Namely, a firm embedding and a stationary combination are still preferably achieved. In this embodiment, a threaded section A is further defined on the shank portion 31. Wherein, the threaded section A is composed of a plurality of auxiliary threaded units 35 that are surroundingly disposed between the threaded units 34. Additionally, a first diameter r2 of the auxiliary threaded units 35 is smaller than a second diameter r1 of the threaded units 34. As it should be, the threaded section A could be freely adapted to the third preferred embodiment as shown in FIG. 10. Accordingly, a high-low threaded screw 3 is resulted from the threaded units 34 and the auxiliary threaded units 35. Such high-low threaded units are beneficial to accelerate the expelling speed for the cutting debris, decrease the drilling resistance, and remove the obstruction resulted from redundant cutting debris. Favorably, the screw 3 could be smoothly fastened into the object 4 and could be firmly embedded in the same without any protrudent part.

Figure 11:
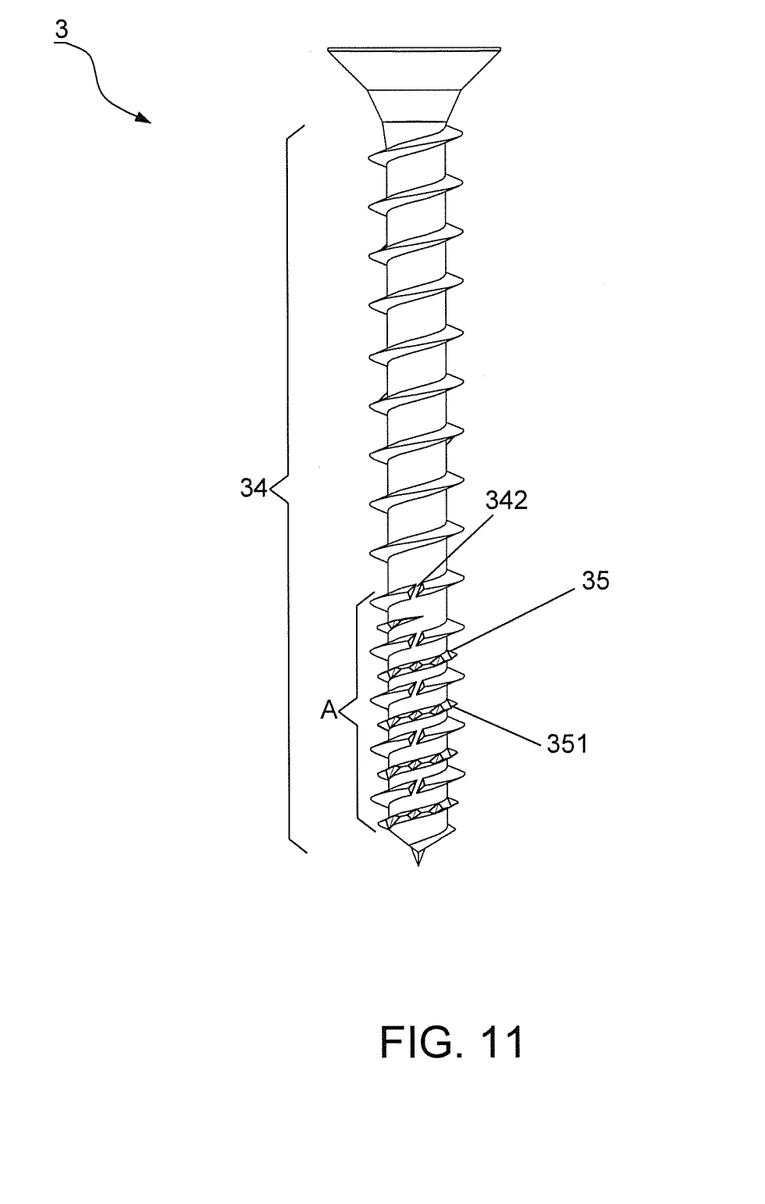
FIG. 11 is a schematic view showing a sixth preferred embodiment of the present invention.
Figure 12:
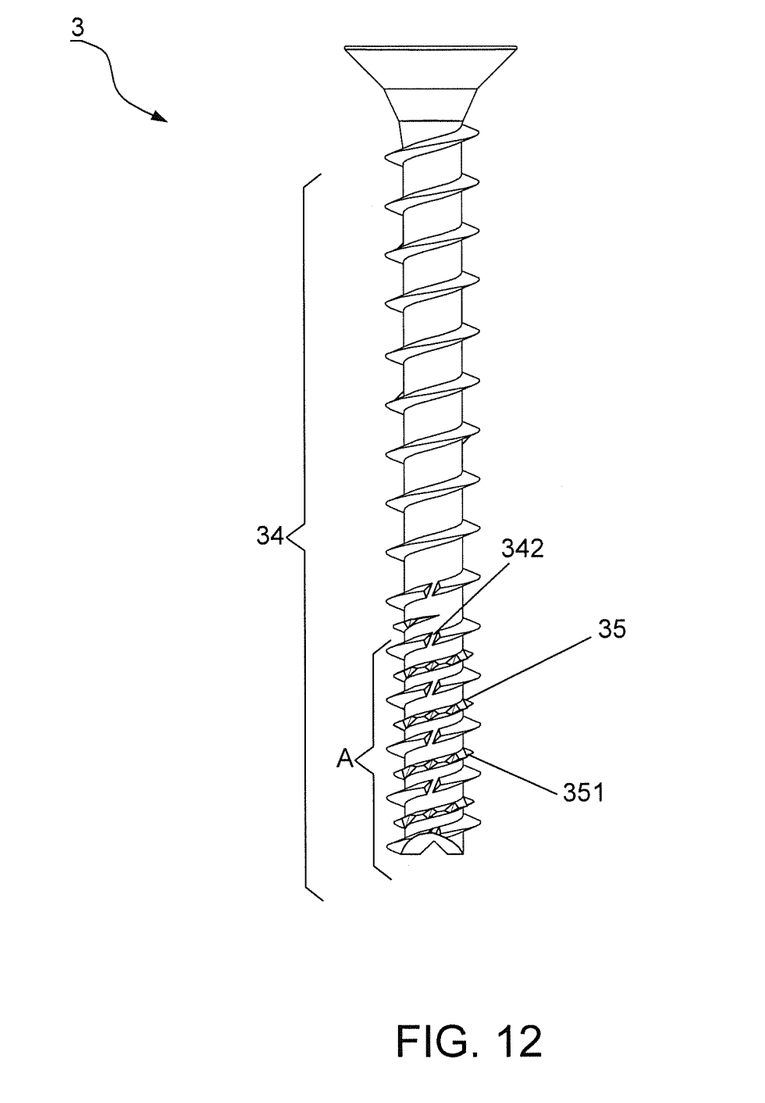
FIG. 12 is a schematic view showing a seventh preferred embodiment of the present invention.

Referring to FIG. 11, a sixth preferred embodiment of the present invention is shown. The difference between this embodiment and afore two embodiments is that a plurality of indented units 351 are defined on the auxiliary threaded unit 35. Further, a plurality of slots 342 are positioned on the threaded units 34 for cooperating with the indented units 351. Wherein, both the slots 342 and the indented units 351 could be cooperatively adapted to afore embodiments as shown in FIG. 12. Whereby, a drilling effect and a concurrent severing function could be brought about by the slots 342 and the indented units 351, which enhances the drilling effect of the drilling portion 33 and promotes the cutting efficiency as well as the fastening performance. Favorably, the cutting debris is still timely expelled, which allows the friction and the torque in time of drilling to be largely reduced. Thus, the screw 3 is preferably embedded in the object 4, and a firm and stationary fastening performance is achieved.

To sum up, the present invention in particularly utilizes the positioning member to render a stable positioning effect. Then the two cutting planes convergently cooperate with a cutting edge formed therebetween, thereby speedily removing the cutting debris generated in time of drilling via the cutting planes and the channel amid the threaded units. Accordingly, no redundant cutting debris would pile the vacancy between the screw and the object, so the drilling torque could be decreased, but the drilling speed could be enhanced. Thus, the screw of the present invention could be firmly and smoothly embedded in the object for a further combination.

While we have shown and described the embodiment in accordance with the present invention, it should be clear to those skilled in the art that further embodiments may be made without departing from the scope of the present invention.

We claim:
1. A screw comprising:
a shank portion, a head portion disposed at one end of said shank portion, a drilling portion disposed at the other end of said shank portion, and a plurality of threaded units spirally disposed around said shank portion to define a first inclined surface;
two inclined cutting planes being formed on said drilling portion and being connected at a cutting edge, each of said cutting planes defining a second inclined surface different from said first inclined surface, said cutting planes characterized in that, a positioning member is defined on said cutting planes of said drilling portion for stabilizing said cutting edge to execute cutting;
said threaded units extending toward said cutting edge and connecting to one end of said cutting edge wherein, a threaded section including a plurality of auxiliary threaded units is disposed around said shank portion for said auxiliary threaded units to be disposed between said threaded units, and a first diameter of said auxiliary threaded units is smaller than a second diameter of said threaded units; and a plurality of indented units are defined on said auxiliary threaded units; a plurality of slots are defined on a part of said threaded units.

2. The screw as claimed in claim 1, wherein said positioning member is integrally bulged outwards from said cutting planes to form a pointed unit.

3. The screw as claimed in claim 2, wherein, said pointed unit is formed by a plurality of inclined walls to structure a pyramid.

4. The screw as claimed in claim 2, wherein, said pointed unit is structured into a cone.

5. The screw as claimed in claim 1, wherein, said positioning member is formed by a plurality of inclined walls that are indented inwards from said cutting planes for forming a valley on said cutting planes, and each of said inclined walls and said cutting edge are converged at a point.

6. A screw comprising:

a shank portion, a head portion disposed at one end of said shank portion, a drilling portion disposed at the other end of said shank portion, and a plurality of threaded units spirally disposed around said shank portion to define a first inclined surface;

two inclined cutting planes being formed on said drilling portion and being connected at a cutting edge, each of said cutting planes defining a second inclined surface different from said first inclined surface, said cutting planes characterized in that, a positioning member is defined on said cutting planes of said drilling portion for stabilizing said cutting edge to execute cutting;

said threaded units extending toward said cutting edge and connecting to one end of said cutting edge;

wherein, said positioning member is formed by a plurality of inclined walls that are indented inwards from said cutting planes for forming a valley on said cutting planes, and each of said inclined walls and said cutting edge are converged at a point.

7. The screw as claimed in claim 6, wherein said positioning member is integrally bulged outwards from said cutting planes to form a pointed unit.

8. The screw as claimed in claim 7, wherein, said pointed unit is formed by a plurality of inclined walls to structure a pyramid.

9. The screw as claimed in claim 7, wherein, said pointed unit is structured into a cone.

* * * * *